Dec. 23, 1969 S. KORNBLAU 3,485,091

DUROMETER

Filed Aug. 25, 1967

United States Patent Office 3,485,091

Patented Dec. 23, 1969

1

3,485,091

DUROMETER

Sol Kornblau, New York, N.Y., assignor to The Shore Instrument & Mfg. Company Inc., Jamaica, N.Y.

Filed Aug. 25, 1967, Ser. No. 663,389
Int. Cl. G01n 3/48, 3/00
U.S. Cl. 73—81 2 Claims

ABSTRACT OF THE DISCLOSURE

This invention relates to durometers adapted to test rigid to semi-rigid material. In this invention a non-rotatable indentor is fixedly secured to a cam plate. A cam pin fixedly located in a ratio adjusting link slidingly engages the walls of a U-shaped channel disposed in said cam plate. The ratio adjusting link is adjustably secured to a segment gear to enable calibration of the dial setting. The segment gear in turn drives a pinion fixedly secured to a shaft to which in turn a dial hand is fixedly secured. The indentor is disposed in the base of a stem. The top portion of the stem is provided with a coil spring to aid in the penetration of said relatively rigid material.

It is an object of this invention to provide a durometer adapted to test relatively rigid material.

Figure 2:
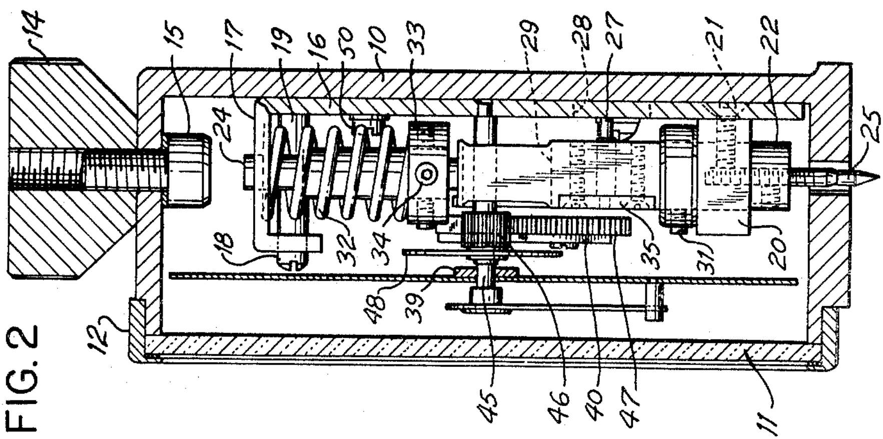
Figure 1:
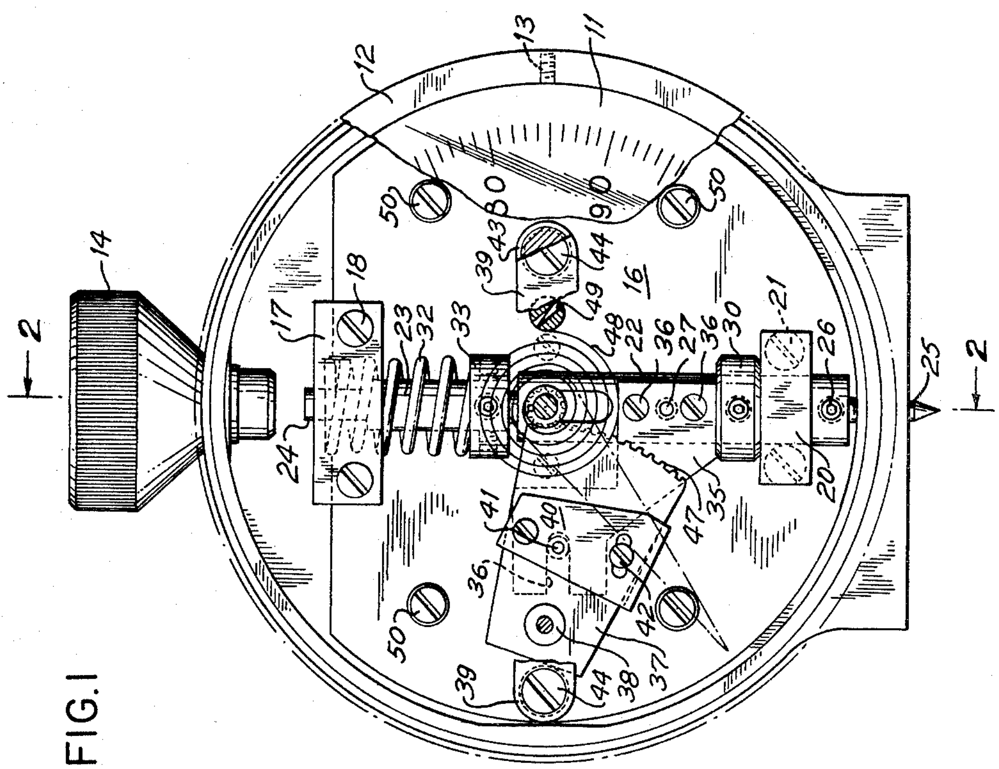

This and other objects of this invention will become apparent upon reading the following descriptive disclosure of an illustrative embodiment shown in the accompanying drawing in which FIG. 1 is a front view of the durometer, broken away in part, to show the working mechanism thereof and FIGURE 2 is a section view taken on line 2—2 of FIG. 1.

In U.S. 3,136,153 patent, there is described a durometer adapted for testing relatively soft material such as rubber, soft plastic and the like.

This invention is a modification of the patented durometer, wherein a coil spring is used to aid the penetration of relatively rigid material.

Turning to the drawing, the durometer comprises a cylindrical instrument case 10 having a glass 11 and a bezel 12 secured by a screw 13. The case is provided with a grip knob 14 secured to the case 10 by screw 15.

A feature of this invention is the provision of a coil spring co-acting with an indentor to provide for the testing of rigid and semi-rigid material. To this effect, a substantially cylindrical gage frame 16 is provided with an integral flap 17 supported by flap screws 18 and spacer sleeves 19. A centrally apertured bearing block 20 is secured to the frame by screws 21.

According to this invention a cylindrical stem 22 is disposed slidingly in block 20 adjacent its base and protrudes slidingly through the aperture of the flap 17. The top portion 23 of the stem is threaded and of lesser diameter than the bottom portion.

A threaded indentor 25 is adjustably secured in a threaded cavity of the base of stem 22. The stem is fixedly provided with a key pin 27 which slidingly protrudes in an elongated slot 28 in frame 16 to prevent rotation of the stem.

An angularly disposed cam plate secured to the stem is another feature of this invention.

The stem 22 is provided with a slot 29 adjacent the threaded portion 23. A stop collar 30 is adjustably secured to the stem by a lock screw 31. A coil spring 32 is disposed about the threaded portion 23 of the stem and is adjusted to rest against flap 17 by a threaded collar 33 disposed on the stem portion 23. The collar 33 is

2 secured to the stem portion 23 by a plurality of set screws 34 located therein.

A cam plate 35 is fixedly secured to a flat surface portion of stem 22 by a pair of screws 36. The cam plate 35 is provided with a U-shaped channel 36 at its upper portion. A segment gear 37 is fixedly secured to a pivot pin 38 about its shank, the end studs of pin 38 being rotatively disposed respectively in the frame 16 and in a front frame plate 39.

A ratio adjusting link 40 is movably secured to a segment gear 37 by screw 41. The link 40 is provided with a cam pin 41 fixedly therein, which protrudes through an enlarged aperture in segment gear 37 to engage the walls of channel 36 of cam plate 35. The link 40 is also provided with a suitable slot through which a ratio adjusting screw 42 is disposed and threaded into segment gear 37. A pair of cylindrical gage frame studs 43 of suitable length are fixedly secured at one end to the gage frame 16 and they are provided at the other end with threaded cavity to receive stud screws 44 to secure the front frame plate 39 firmly in space relationship above the frame 16.

The front plate 39 is provided with an aperture to receive the front end of a pinion shaft 45, said shaft 45 being disposed through the slot 29 of stem 22 and into the frame 16. The shaft 45 is provided with a fixed pinion 46 adapted to engage the teeth 47 of the segment gear 37. A hairspring 48 is secured to the pinion shaft 45 at one end and at the other end to a retaining stud 49 integral with front plate 39 at the bottom surface thereof.

The assembly of parts on the frame 16 is removable as a unit from the instrument case 10, and said frame 16 is secured to the case by a plurality of screws 50.

The durometer of this invention is calibrated by means of adjustment of the ratio adjusting link 40 to the segment gear 37 and by obtaining the correct protrusion of the indentor 25 with removal of all slack in the coil 32 against flap 17 by manipulation of the adjusting nut 33.

What is claimed is:

1. In a durometer for penetrative testing of relatively hard material, having an instrument case apertured at its base for passage of an indentor pin, and having a back frame plate secured to said case, a pair of spaced apart studs perpendicularly secured to said back plate, a front frame plate secured to the top of said studs, a carrier stem for an indentor pin secured by intermediate mounting means between said front and back plates, a cam plate having a suitable cam groove therein fixedly secured to said stem, a segment gear pivotally secured to said front plate and having an aperture disposed over said cam groove, a pivot pin disposed pivotally in said front plate, a gear secured to said pivot pin and engaging the segment teeth of said segment gear, a dial pointer secured to said pivot pin, a pivot pin spring secured at one end to said pivot pin and at the other end to said front plate, an adjustment link plate having an adjustment slot and a fixed cam pin disposed through said aperture of said segment gear and in said cam groove, the improvement comprising an apertured flap secured to the top of said back plate; an apertured bearing block secured to the bottom of said back plate, said aperture of said flap and said block being disposed in linear relationship; said carrier stem having a cylindrical linear configuration having a top threaded portion terminating in a smaller diameter non-threaded stud disposed slidingly in said flap aperture, the bottom of said stem being disposed slidingly in said bearing block, said stem having a centrally disposed longitudinal slot for passage of said pivot pin from the front plate to said back plate; an adjustment nut threadingly disposed on said threaded portion of said stem; a coil spring disposed on said adjustment nut and engaging said flap whereby relatively heavy pressure exerted on said indentor pin of said stem is directly and linearly transferred to said coil spring without distortional deformation of said stem.

2. The improved durometer of claim 1 comprising said back plate having a longitudinal slot in parallel spaced apart relationship to said stem; a pin fixedly keyed to said stem and disposed in said back plate slot to prevent rotation of said stem.

References Cited

UNITED STATES PATENTS

| | | | |
|---|---|---|---|
| 535,224 | 3/1895 | Schopper | 33—172 |
| 2,453,042 | 11/1948 | Shore | 73—81 |

RICHARD C. QUEISSER, Primary Examiner

C. E. SNEE, Assistant Examiner

U.S. Cl. X.R.

73—78